(12) United States Patent
Nishimura et al.

(10) Patent No.: US 9,076,559 B2
(45) Date of Patent: Jul. 7, 2015

(54) METHOD OF OPERATING NUCLEAR PLANT

(75) Inventors: Takao Nishimura, Tokyo (JP); Ryuji Umehara, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 681 days.

(21) Appl. No.: 12/995,568

(22) PCT Filed: Apr. 3, 2009

(86) PCT No.: PCT/JP2009/056970
§ 371 (c)(1),
(2), (4) Date: Dec. 1, 2010

(87) PCT Pub. No.: WO2010/018700
PCT Pub. Date: Feb. 18, 2010

(65) Prior Publication Data
US 2011/0075785 A1 Mar. 31, 2011

(30) Foreign Application Priority Data
Aug. 12, 2008 (JP) ................................. 2008-208212

(51) Int. Cl.
*G21C 9/00* (2006.01)
*G21C 17/022* (2006.01)
*G21D 3/08* (2006.01)
*G21D 1/00* (2006.01)

(52) U.S. Cl.
CPC .............. *G21C 17/0225* (2013.01); *G21D 1/00* (2013.01); *G21D 3/08* (2013.01); *Y02E 30/40* (2013.01)

(58) Field of Classification Search
CPC ......... G21C 17/0225; G21D 3/08; G21D 1/00

USPC .......................................................... 376/306
See application file for complete search history.

(56) References Cited

U.S. PATENT DOCUMENTS

| | | | |
|---|---|---|---|
| 4,756,874 A | | 7/1988 | Ruiz et al. |
| 5,108,697 A | * | 4/1992 | Esposito et al. .............. 376/306 |

(Continued)

FOREIGN PATENT DOCUMENTS

| | | |
|---|---|---|
| EP | 599619 A1 | 6/1994 |
| JP | 63-172999 A | 7/1988 |

(Continued)

OTHER PUBLICATIONS

Chinese Office Action dated Dec. 24, 2012, issued in corresponding Chinese Patent Application No. 200980128239.4, with English translation (10 pages).

(Continued)

*Primary Examiner* — Frank J McGue
(74) *Attorney, Agent, or Firm* — Westerman, Hattori, Daniels & Adrian, LLP

(57) ABSTRACT

An object is to reduce radiation exposure in a nuclear plant. A nuclear plant 1 is a nuclear power generating plant where steam is generated by thermal energy generated by nuclear fission of a nuclear fuel 2C in a nuclear reactor 2, and a turbine 8 is driven by the steam to generate heat by a power generator 10. After a nuclear plant 1 is newly constructed, when a primary cooling system of the nuclear reactor 2 raises the temperature to around a power operation temperature for the first time, zinc is injected into a primary coolant C1 present in the primary cooling system by a zinc injector 20.

2 Claims, 6 Drawing Sheets

(56) References Cited

U.S. PATENT DOCUMENTS

| | | | |
|---|---|---|---|
| 5,171,515 A * | 12/1992 | Panson et al. | 376/306 |
| 5,715,290 A | 2/1998 | Uetake et al. | |
| 5,896,433 A * | 4/1999 | Kelen | 376/306 |
| 6,314,153 B1 * | 11/2001 | Henzel et al. | 376/306 |
| 7,264,770 B2 * | 9/2007 | Andresen et al. | 422/7 |
| 2001/0026604 A1 * | 10/2001 | Marble | 376/306 |
| 2009/0299155 A1 * | 12/2009 | Yang et al. | 600/301 |

FOREIGN PATENT DOCUMENTS

| | | | |
|---|---|---|---|
| JP | 2-013894 A | 1/1990 | |
| JP | 6-214093 A | 8/1994 | |
| JP | 7-20277 A | 1/1995 | |
| JP | 7-252669 A | 10/1995 | |
| JP | 8-086899 A | 4/1996 | |
| JP | 8-220293 A | 8/1996 | |
| JP | 2000-162383 A | 6/2000 | |
| JP | 2007-192745 A | 8/2007 | |
| JP | 2010-043956 A | 2/2010 | |

OTHER PUBLICATIONS

Wood J. C. "Recent Developments in LWR Radiation Field Control"; Progress in Nuclear Energy (1987), vol. 19., No. 3, pp. 241-266.

European Search Report dated Mar. 15, 2012, issued in corresponding European Patent Application No. 09806596.4.

Wood, Christopher J. et al.; "Recent developments in LWR radiation field control"; Progress in Nuclear Energy, Pergamon Press, Oxford, GB, vol. 19, No. 3, 1987, pp. 241-266, XP023636204. (cited in European Search Report dated Mar. 15, 2012).

Riess Rolf et al.; "LCC-2 Annual Report"; 2006, pp. 1-45, XP007920208, Retrieved from the internet: URL:http://www.antinernational.com/fileadmin/Prducts_and_handbooks/LCC/First_chapter_LCC_AR.pdf. (cited in European Search Report dated Mar. 15, 2012).

Japanese Notice of Allowance dated Sep. 14, 2012, issued in corresponding Japanese Patent Application No. 2008-208212, (2 pages). With Partial English Translation.

Ueda, Susumu et al. "Dose Reduction Measures at Tsuruga Units 3 and 4," 11th International Conference on Nuclear Engineering Tokyo Japan, Apr. 20-23, 2003, pp. 1-8.

Ooshima, Shigeo et al. "Primary Water Chemistry for Radiation Source Reduction," Mitsubishi Heavy Industries Technical Review, May 1995, vol. 32, No. 3, pp. 188-190, w/ partial translation.

International Search Report of PCT/JP2009/056970, mailing date Jun. 9, 2009.

Notification of the Decision to Grant mailed on Aug. 21, 2013 in corresponding Chinese patent application 200980128239.4. English translation (4 pages).

European Notice of Allowance dated Dec. 18, 2014, issued in corresponding EP Patent Application No. 09806596.4 (46 pages).

* cited by examiner

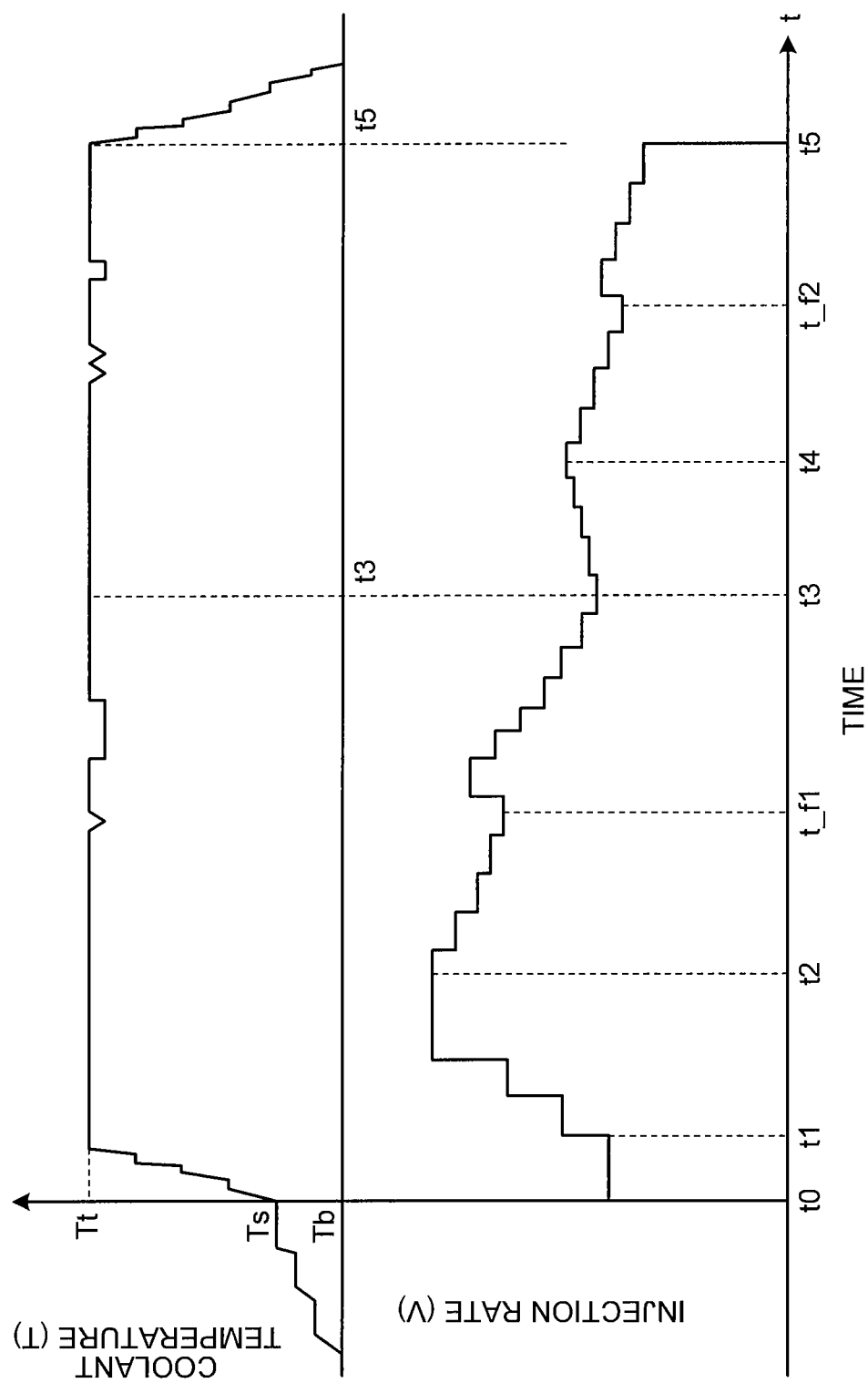

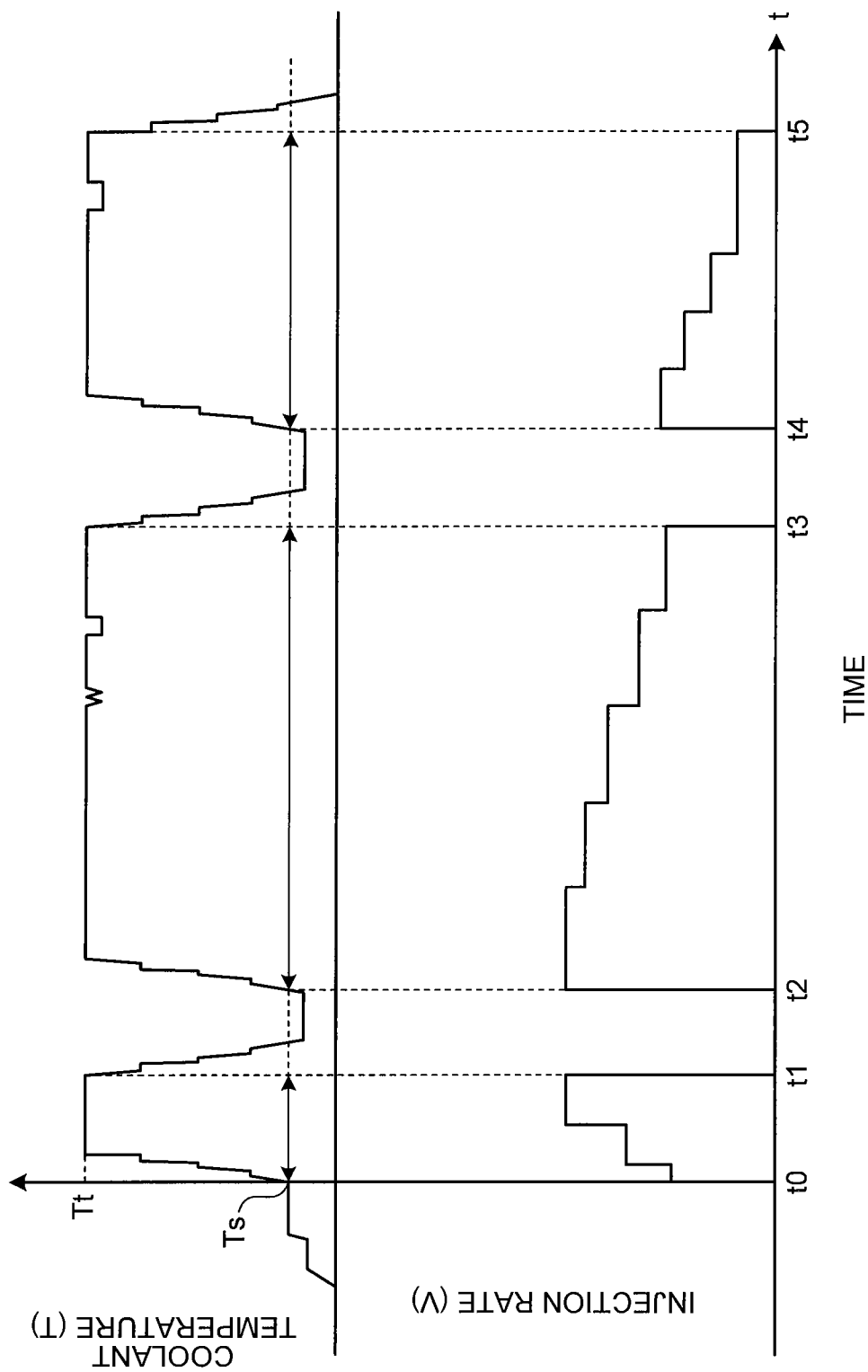

METHOD OF OPERATING NUCLEAR PLANT

TECHNICAL FIELD

The present invention relates to a method of operating a newly constructed nuclear reactor.

BACKGROUND ART

As a radiation-exposure reduction measure in a nuclear plant that has been operated for several years to several decades, zinc is injected into a coolant of a nuclear reactor after the nuclear reactor has gone critical. For example, Patent document 1 discloses a technique of injecting zinc into a primary coolant in a state with an oxide film being formed on an inner surface of a piping of a primary cooling system of the nuclear reactor, which comes into contact with the primary coolant.

PRIOR ART DOCUMENTS

Patent Documents
Patent document 1: Japanese Patent Application Laid-open No. H2-13894

DISCLOSURE OF INVENTION

Problem to be Solved by the Invention

In a nuclear plant, it is desired to reduce radiation exposure as much as possible, and further reduction of radiation exposure has been desired. The present invention has been achieved under such circumstances, and an object of the present invention is to further reduce radiation exposure in a nuclear plant.

Means for Solving Problem

According to an aspect of the present invention, a method of operating a nuclear plant includes injecting zinc into a coolant present in a primary cooling system of a nuclear reactor, after construction of the nuclear reactor and during execution of a hot function test.

According to the method of operating a nuclear plant of the present invention, zinc is injected during a hot function test. In the hot function test, because the primary cooling system (mainly, a primary coolant) reaches a power operation temperature (about 300° C.) for the first time, zinc is injected in a state with an oxide film not being formed on an inner surface of a piping through which a coolant (the primary cooling system) of the nuclear reactor passes, an inner surface of a heat transfer tube of a steam generator, an inner surface of a steam generator channel head, and surfaces of core internals and the like, which come into contact with the coolant. Accordingly, zinc is incorporated into the oxide film with the growth of the oxide film, so that a corrosion suppression effect of zinc is exerted effectively. As a result, it can be suppressed that Ni, which is a parent element of Co-58 as a radiation source, is transferred into the coolant before the nuclear reactor goes critical, thereby decreasing generation of Co-58 as the radiation source. Further, because zinc is incorporated into the oxide film, incorporation of Co-58 as the radiation source into the oxide film is suppressed. Due to these actions, further radiation reduction effect can be obtained.

As a preferable aspect of the present invention, in the method of operating a nuclear plant, it is desired to inject zinc into the coolant when the temperature of the coolant reaches a predetermined temperature (for example, 60° C. to 90° C.). When the temperature of the coolant is low, the oxide film is hardly formed and thus, even if zinc is injected, an incorporation rate thereof into the oxide film becomes low and a rate of zinc reduced by removal of a demineralizer. However, according to the configuration described above, because zinc is supplied after the oxide film is started to be formed, zinc can be effectively incorporated into the oxide film. As a result, excessive consumption of zinc can be suppressed.

Advantageously, in the method of operating a nuclear plant, when a concentration of the zinc included in the coolant is lower than a preset predetermined value, an injection rate of the zinc is increased. Accordingly, shortage in an injection amount of zinc can be avoided, and zinc can be efficiently incorporated into the oxide film.

Advantageously, in the method of operating a nuclear plant, an increased amount of an injection rate of the zinc at a first stage of injection of the zinc is larger than an increased amount of an injection rate of the zinc at a second stage of injection of the zinc. Accordingly, the concentration of zinc in the coolant can be maintained at an appropriate value corresponding to a formation rate of the oxide film and an incorporation amount of zinc into the oxide film.

Advantageously, in the method of operating a nuclear plant, when the concentration of the zinc included in the coolant is higher than a preset predetermined value, an injection rate of the zinc is decreased. Accordingly, excessive supply of zinc can be suppressed.

Advantageously, in the method of operating a nuclear plant, a reduction rate of an injection rate of the zinc at the second stage of injection of the zinc is larger than a reduction rate of an injection rate of the zinc at the first stage of injection of the zinc. Accordingly, the concentration of zinc in the coolant can be maintained at an appropriate value corresponding to the formation rate of the oxide film and the incorporation amount of zinc into the oxide film.

Advantageously, in the method of operating a nuclear plant, when heating of the coolant is stopped, injection of the zinc into the coolant is stopped. Accordingly, excessive supply of zinc can be suppressed, thereby enabling to decrease the consumption amount of zinc.

Advantageously, in the method of operating a nuclear plant, an amount of the zinc injected into the coolant at the first stage of injection of the zinc is larger than an amount of the zinc injected into the coolant at the second stage of injection of the zinc. Accordingly, the concentration of zinc in the coolant can be maintained at an appropriate value corresponding to the formation rate of the oxide film and the incorporation amount of zinc into the oxide film.

Effect of the Invention

The present invention can further reduce radiation exposure in a nuclear plant.

BRIEF DESCRIPTION OF DRAWINGS

FIG. 5 is a timing chart of the method of operating a nuclear plant according to the embodiment.

FIG. 6 is a timing chart of a method of operating a nuclear plant according to a modification of the embodiment.

BEST MODE(S) FOR CARRYING OUT THE INVENTION

The present invention is explained below in detail with reference to the accompanying drawings. The present invention is not limited the following explanations. In addition, constituent elements in the explanations include those that can be easily assumed by persons skilled in the art, that are substantially equivalent, and so-called equivalents.

Embodiment

Figure 1:
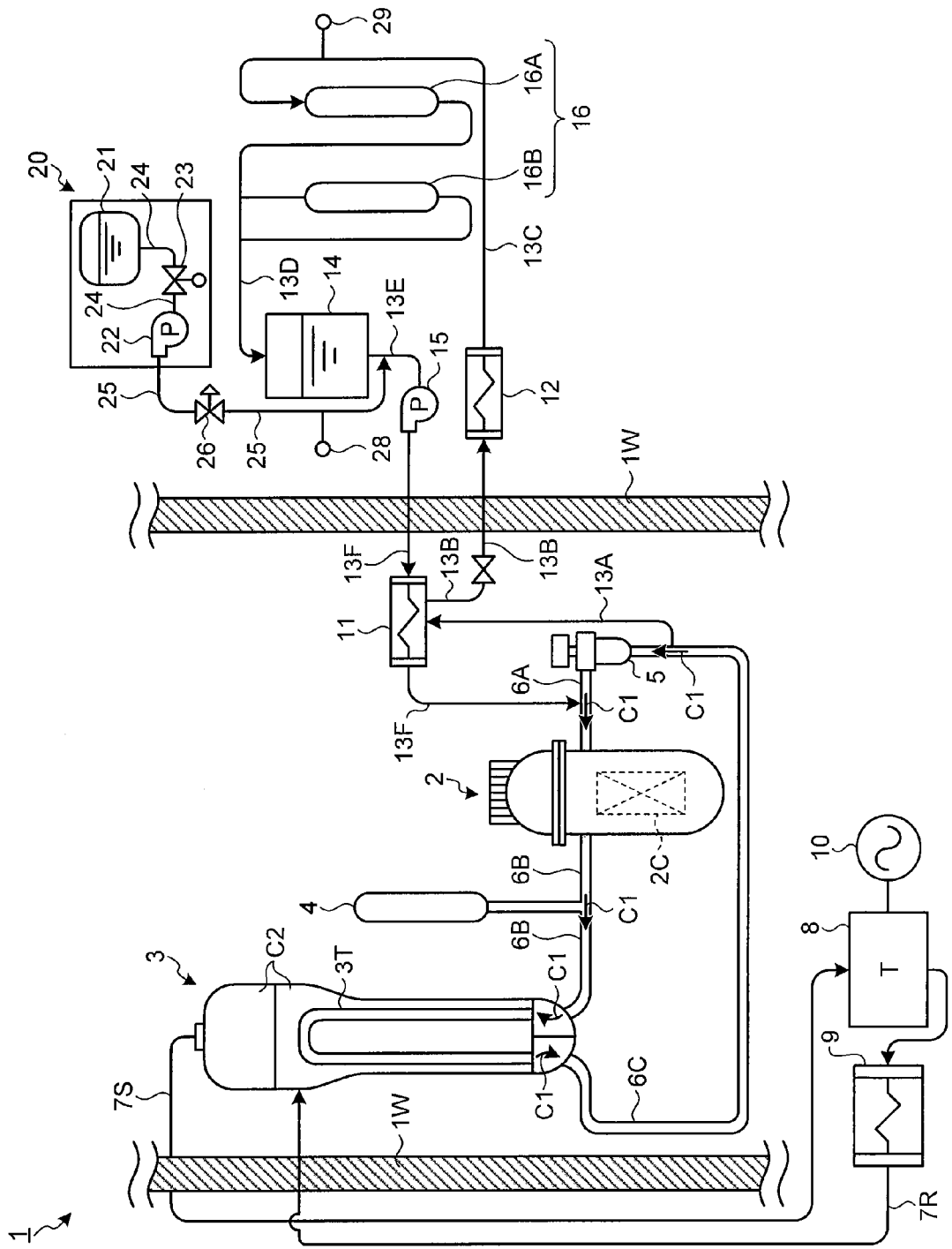
FIG. 1 is a schematic diagram of a nuclear plant.

FIG. 1 is a schematic diagram of a nuclear plant. In an embodiment of the present invention, there is a feature in that after a nuclear reactor is constructed, when a cooling system of the nuclear reactor (a primary cooling system in a PWR) raises temperature to around an power operation temperature for the first time (during execution of a hot function test in the PWR), zinc (Zn) is injected into a coolant (a primary coolant in the PWR) present in the cooling system.

In the present embodiment, a nuclear plant 1 is a nuclear power generating facility. A nuclear reactor 2 constituting the nuclear plant 1 is a pressurized water reactor (PWR). A method of operating a nuclear plant according to the present embodiment is particularly suitable for the PWR that requires execution of the hot function test, in which the primary cooling system raises the temperature to around the power operation temperature, before the nuclear reactor goes critical for the first time.

In the nuclear plant 1, the nuclear reactor 2, a steam generator 3, a pressurizer 4, a primary coolant pump 5, and a regenerative heat exchanger 11 are arranged in a containment vessel 1W. A turbine 8, a condenser 9, and a power generator 10 are arranged outside the containment vessel 1W. In the nuclear reactor 2, a nuclear fuel 2C is arranged in a pressure vessel. The pressure vessel is filled with a primary coolant C1 (corresponding to cooling water and light water is used, for example). The primary coolant pump 5 and the nuclear reactor 2 are connected by a primary-coolant first-supply path 6A, and the nuclear reactor 2 and the steam generator 3 are connected by a primary-coolant second-supply path 6B. The steam generator 3 and the primary coolant pump 5 are connected by a primary-coolant recovery path 6C.

According to such a configuration, the primary coolant C1 discharged from the primary coolant pump 5 is supplied into the pressure vessel of the nuclear reactor 2, through the primary-coolant first-supply path 6A. The primary coolant C1 is heated by thermal energy generated by fission reaction of the nuclear fuel 2C arranged in the pressure vessel. The heated primary coolant C1 is supplied to the steam generator 3, through the primary-coolant second-supply path 6B. After passing through a heat transfer tube 3T of the steam generator 3, the primary coolant C1 outflows from the steam generator 3, returns to the primary coolant pump 5 through the primary-coolant recovery path 6C, and is discharged again into the pressure vessel of the nuclear reactor 2 through the primary-coolant first-supply path 6A.

The steam generator 3 includes a plurality of heat transfer tubes 3T, and a secondary coolant C2 outside the heat transfer tube 3T is heated by the primary coolant C1 flowing in the heat transfer tube 3T and comes to a boil, thereby generating high-temperature and high-pressure steam of the secondary coolant C2. The steam generator 3 and the turbine 8 are connected by a steam supply path 7S, and the condenser 9 and the steam generator 3 are connected by a secondary-coolant recovery path 7R. Accordingly, high-temperature and high-pressure steam of the secondary coolant C2 generated by the steam generator 3 is supplied to the turbine 8 through the steam supply path 7S to drive the turbine 8. Electric power is generated by the power generator 10 connected to a drive shaft of the turbine 8. The secondary coolant C2 having driven the turbine 8 becomes a liquid in the condenser 9, and is delivered to the steam generator 3 again through the secondary-coolant recovery path 7R.

The nuclear reactor 2 is a pressurized-water reactor, and the pressurizer 4 is connected to the primary-coolant second-supply path 6B. The pressurizer 4 applies pressure to the primary coolant C1 in the primary-coolant second-supply path 6B. With such a configuration, the primary coolant C1 does not come to the boil even when being heated by the thermal energy generated by the fission reaction of the nuclear fuel 2C, and circulates in the nuclear reactor 2 and the cooling systems thereof in a liquid phase state. The cooling system of the nuclear reactor 2 is a system in which the primary coolant C1 flows, including the primary coolant pump 5, the primary-coolant first-supply path 6A, the primary-coolant second-supply path 6B, the steam generator 3, and the primary-coolant recovery path 6C.

A demineralizer 16 is provided for reducing impurities included in the primary coolant C1. The demineralizer 16 includes a first demineralizer 16A and a second demineralizer 16B, and is provided outside the containment vessel 1W. The first demineralizer 16A is a hotbed-type coolant demineralizer, and the second demineralizer 16B is a cation coolant demineralizer. The primary coolant C1 extracted from an inlet side (an upstream side) of the primary coolant pump 5 is supplied from the cooling system of the nuclear reactor 2 to the demineralizer 16 to perform demineralization processing, and the primary coolant C1 after demineralization is returned to an outlet side (a downstream side) of the primary coolant pump 5.

A demineralization system of the primary coolant C1 includes a primary-coolant extraction path 13A, the regenerative heat exchanger 11, a primary coolant path 13B, a non-regenerative heat exchanger 12, a primary coolant path 13C, the demineralizer 16, a primary coolant path 13D, a volume control tank 14, and primary-coolant return paths 13E and 13F. The primary-coolant extraction path 13A connects the primary-coolant recovery path 6C constituting the cooling system of the nuclear reactor 2 to the regenerative heat exchanger 11. The regenerative heat exchanger 11 and the non-regenerative heat exchanger 12 are connected by the primary coolant path 13B, and the non-regenerative heat exchanger 12 and the demineralizer 16 are connected by the primary coolant path 13C.

The demineralizer 16 and the volume control tank 14 are connected by the primary coolant path 13D, and the volume control tank 14 and the regenerative heat exchanger 11 are connected by the primary-coolant return path 13E. The regenerative heat exchanger 11 and the primary-coolant first-supply path 6A are connected by the primary-coolant return path 13F. A filling pump 15 is provided in the primary-coolant return path 13E.

The primary coolant C1 is extracted from the primary-coolant extraction path 13A, that is, on the inlet side (the upstream side) of the primary coolant pump 5. The primary coolant C1 extracted from the cooling system of the nuclear reactor 2 is led to the regenerative heat exchanger 11, and then to the demineralizer 16 through the primary coolant path 13B, the non-regenerative heat exchanger 12, and the primary coolant path 13C, and is demineralized. The demineralized primary coolant C1 is temporarily stored in the volume control tank 14 through the primary coolant path 13D, and is fed to the regenerative heat exchanger 11 by the filling pump 15 provided in the primary-coolant return path 13E. The primary coolant C1 having passed through the regenerative heat exchanger 11 is returned to the primary-coolant first-supply path 6A, that is, to the outlet side (the downstream side) of the primary coolant pump 5 through the primary-coolant return path 13F.

Reduction of radiation exposure can be realized by injecting zinc into the primary coolant C1. It is considered that this is due to the following reason. That is, Co in the oxide film formed on an inner surface of a piping constituting the primary cooling system (such as the heat transfer tube 3T and the primary-coolant first-supply path 6A, hereinafter, "primary cooling-system piping") is replaced by zinc, by using a fact that zinc is more readily incorporated into the oxide film than Co, to suppress that Co-58, which is a radiation exposure source, is incorporated into the oxide film, thereby reducing radiation exposure.

In the nuclear reactor 2, nickel (Ni), which is a parent element of Co-58, a radioactive nuclide which becomes the radiation exposure source, is transferred to the primary coolant C1 from the surface of a part of the steam generator 3 coming into contact with the primary coolant C1, and Ni in the primary coolant C1 is radio-activated by radiation generated by the fission reaction of the nuclear fuel 2C to become cobalt 58 (Co-58). Zinc injected into the primary coolant C1 is incorporated into the oxide film formed on the surface of a base material (the heat transfer tube 3T and the like) and has an action that makes Ni included in the base material hard to pass through the oxide film.

That is, an effect of suppressing corrosion of the primary cooling-system piping of the nuclear reactor 2 can be obtained by injection of zinc. An amount of Ni included in the base material on a member of the steam generator 3 coming into contact with the primary coolant C1 to be transferred to the primary coolant C1 through the oxide film can be reduced by injecting zinc into the primary coolant C1 due to a corrosion suppression effect of zinc. As a result, because the amount of Ni, which is a parent element of Co-58 as the radiation exposure source, present in the primary coolant C1 can be reduced, a radiation reduction effect can be obtained.

In the present embodiment, a zinc injector 20 is included for injecting zinc into the primary coolant C1. In the present embodiment, zinc is injected into the primary coolant C1 from between the volume control tank 14 constituting the demineralization system of the primary coolant C1 and the filling pump 15, in a form of DZA (depleted zinc acetate).

The zinc injector 20 includes a zinc tank 21, a zinc injection pump 22, which is a zinc injection unit, a zinc supply path 24 that connects the zinc tank 21 and the zinc injection pump 22, and a flow regulating valve 23 provided in the zinc supply path 24. Depleted zinc acetate is in a liquid form, and is stored in the zinc tank 21. A zinc injection rate is regulated by the flow regulating valve 23. The zinc injection rate can be also regulated by controlling the zinc injection pump 22. In the present embodiment, the zinc injection rate is regulated by using at least one of the zinc injection pump 22 and the flow regulating valve 23.

The zinc injection pump 22 and the primary-coolant return path 13E are connected by a zinc injection path 25. An on-off valve 26 is provided in the zinc injection path 25. The on-off valve 26 is opened when injection of zinc is required, and is closed when injection of zinc is not required. A flowmeter 28 that measures the flow rate of zinc injected into the primary coolant C1 is provided in the zinc injection path 25. Accordingly, the flow rate of zinc to be injected into the primary coolant C1 is measured. A primary-coolant sampling spot 29 for measuring the concentration of zinc in the primary coolant C1 is provided in the primary coolant path 13C that constitutes the demineralization system of the primary coolant C1. Accordingly, the concentration of zinc included in the primary coolant C1 is measured. The operation of the zinc injection pump 22, the flow regulating valve 23, and the on-off valve 26 is respectively controlled by, for example, a manual operation of a worker. The flow rate of zinc measured by the flowmeter 28 and the concentration of zinc measured at the primary-coolant sampling spot 29 are used in the method of operating a nuclear plant according to the present embodiment.

When zinc is injected into the primary coolant C1, an aperture of the flow regulating valve 23 and a drive condition of the zinc injection pump 22 are set so that zinc can be injected at a set injection rate. The on-off valve 26 is opened and the flow regulating valve 23 is regulated to the set aperture by the manual operation, and the zinc injection pump 22 is driven under the set drive condition. Accordingly, depleted zinc acetate in the zinc tank 21 passes through the zinc supply path 24 and the zinc injection path 25 and is injected into the primary coolant C1 in the primary-coolant return path 13E.

Zinc injected into the primary coolant C1 from between the volume control tank 14 and the filling pump 15 is fed to the regenerative heat exchanger 11 together with the primary coolant C1 by the filling pump 15. After passing through the primary-coolant return path 13F and flowing into the primary-coolant first-supply path 6A, that is, to the outlet side (the downstream side) of the primary coolant pump 5, zinc and the primary coolant C1 circulate in the entire cooling system of the nuclear reactor 2. In this manner, zinc is supplied to the primary coolant C1 present in the cooling system of the nuclear reactor 2.

When the nuclear plant 1 is newly constructed, before the nuclear fuel 2C is loaded into the nuclear reactor 2 and the nuclear reactor 2 goes critical, a cold function test and a hot function test are executed for confirming the function of the nuclear plant 1. The cold function test is executed under normal temperature and pressure, and the hot function test is executed under high temperature and pressure. The hot function test is a test unique to the PWR. In the cold function test, all the possible operating conditions of the plant are simulated for the system configuration, flow rate and the like, for all systems such as a safe injection system, a waste treatment system, and a power supply system, to execute an interlock test, an alarm test, a system operation test, a flow control test and the like to confirm that the system functions as intended.

The hot function test is performed before the nuclear fuel 2C is loaded into the nuclear reactor 2. In the hot function test, after a pressure test of a primary cooling-system facility is executed and soundness of the systems prepared for temperature and pressure rise is confirmed, water level control and pressure control of the pressurizer 4, tests of a relief valve and the like, and a thermal-expansion measurement test of the primary cooling system are executed, with the primary coolant being set to high temperature and pressure (for example, the temperature of the primary coolant is set to 286° C., and the pressure of the primary coolant is set to 15.4 MPa) by the operation of the primary coolant pump 5, to confirm an installation state of devices in the high temperature and pressure state and perform operation checks. In the hot function test, a rotation and power ascension test of the turbine 8 is also executed by using steam generated by the steam generator 3.

In the hot function test, after the nuclear plant 1 (including the nuclear reactor 2) is constructed, the primary cooling system of the nuclear reactor 2 raises the temperature to around the power operation temperature for the first time. After the hot function test, the nuclear fuel 2C is loaded into the nuclear reactor 2, and a safe operational performance of the nuclear plant 1 is confirmed through a subcritical test, a zero-energy-reactor physical test, and a power ascension test to shift to a commercial operation.

After the nuclear reactor 2 goes critical for the first time, the primary cooling system of the nuclear reactor 2 has been already exposed to the high-temperature and high-pressure primary coolant C1, and the oxide film is formed on the inner surface of the primary cooling-system piping. Because zinc has been heretofore injected into the primary coolant after the first critical state, zinc has been injected in a state with the oxide film being formed on the inner surface of the primary cooling-system piping. In the present embodiment, a 690TT material is used for the primary cooling-system piping of the nuclear reactor 2 (at least for the heat transfer tube 3T of the steam generator 3). The 690TT material is obtained by applying heat treatment to an Inconel (Ni base alloy) 690 material, and includes Ni for about 60%.

With regard to the 690TT material, in light water (a primary coolant) at a temperature (about 300° C.) in the operating condition of the PWR reactor, such a result that about 20% to 40% of a corrosion content decreases in 10000 hours can be acquired when zinc is injected in a state with the oxide film not being formed under a condition of the zinc concentration being 10 ppb (parts per billion), as compared with a case that zinc is not injected into the 690TT material without the oxide film formed thereon. The 690TT material is an alloy including Ni of about 60%, and generation of Co-58, which is the radioactive nuclide generated from Ni corroded and released from the 690TT material, is reduced due to the corrosion reduction effect.

A comparison test between a case that zinc is injected into the 690TT material without the oxide film formed thereon under a condition of the zinc concentration being 10 ppb and 2000 hours have passed in light water (a primary coolant) at a temperature (about 300° C.) in the operating condition of the PWR reactor and a case that after the 690TT material without the oxide film formed thereon is exposed to light water (a primary coolant) at the temperature (about 300° C.) in the operating condition of the PWR reactor for 1000 hours, zinc is injected thereto under a condition of the zinc concentration being 10 ppb and 2000 hours have passed is explained. In the comparison test, when values obtained under the respective test conditions by subtracting a corrosion content after 1000 hours have passed from a corrosion content after 2000 hours have passed are compared with each other, a case that zinc is injected in a state with the oxide film not being formed and a case that zinc is injected in a state with the oxide film being formed can be compared with each other.

In light water (a primary coolant) at the temperature (about 300° C.) in the operating condition of the PWR reactor, in a state with zinc being injected into the 690TT material without the oxide film formed thereon under a condition of the zinc concentration being 10 ppb, the corrosion content after 1000 hours have passed is designated as Q1, and the corrosion content after 2000 hours have passed is designated as Q2. Further, the corrosion content in the case that the 690TT material without the oxide film formed thereon is exposed to light water (a primary coolant) at the temperature (about 300° C.) in the operating condition of the PWR reactor for 1000 hours is designated as Q3, and the corrosion content after 1000 hours have passed thereafter in a state in which zinc is injected under a condition of the zinc concentration being 10 ppb is designated as Q4.

Figure 2:
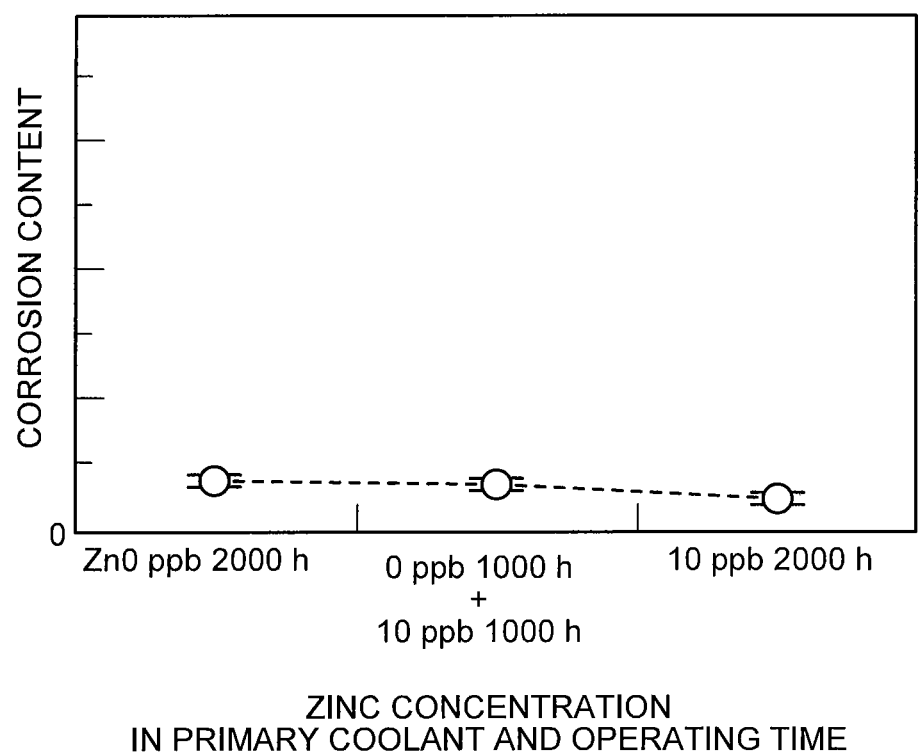
FIG. 2 depicts a relation between a zinc injection amount into a 690TT material and a corrosion content at pH 7.3.
Figure 3:
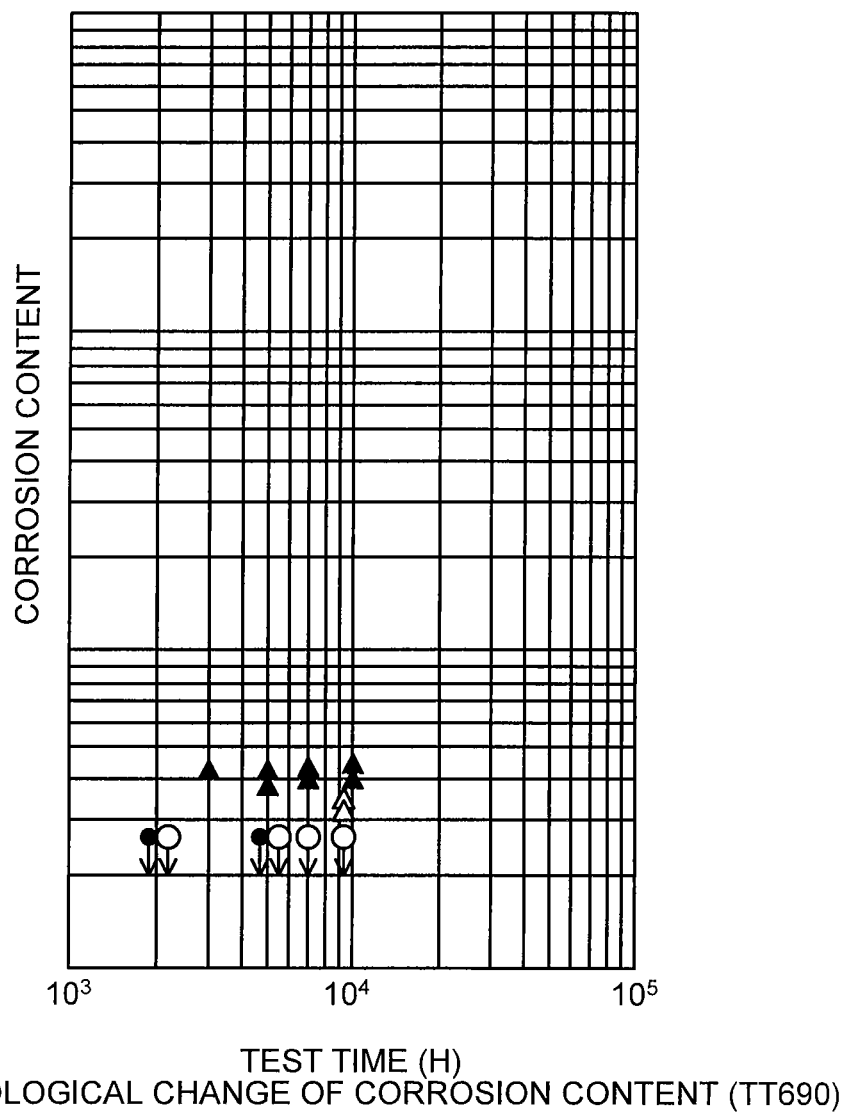
FIG. 3 depicts a chronological change in a corrosion content of the 690TT material.

FIG. 2 depicts a relation between a zinc injection amount into the 690TT material and a corrosion content at pH 7.3. FIG. 2 depicts a result of a corrosion test in which the 690TT material is immersed in water having pH 7.3 for 2000 hours in total. FIG. 3 depicts a chronological change in the corrosion content of the 690TT material, that is, a corrosion content after a corrosion test is performed for 2000 hours under a condition of no injection of zinc (Zn 0 ppb, 2000 h), a corrosion content after a corrosion test is performed without injecting zinc for the first 1000 hours and then a corrosion test is performed under a condition of 10 ppb of zinc being injected for next 1000 hours (0 ppb, 1000 h+10 ppb, 1000 h), and a corrosion content after a corrosion test is performed under a condition of 10 ppb of zinc being injected for 2000 hours (10 ppb, 2000 h). From the result thereof, it is understood that the corrosion content of the 690TT material after the corrosion test is performed for 2000 hours under a condition of injecting zinc slightly decreases than that under the condition without injecting zinc. On the other hand, the corrosion content after the corrosion test is performed without injecting zinc for the first 1000 hours and then the corrosion test is performed under the condition of 10 ppb of zinc being injected for the next 2000 hours is substantially in the same level as that obtained by the corrosion test under the condition without injecting zinc. As a result, it is construed that even in the 690TT material having a high corrosion resistance, the corrosion content can be reduced more by injecting zinc from the beginning.

In this manner, the corrosion content decreases in the case that zinc injection is performed in a state with the oxide film not being formed than the case that zinc injection is performed in a state with the oxide film having already been formed. That is, when zinc injection is performed in the state with the oxide film not being formed, the amount of Ni corroded and released from the 690TT material is reduced than the case that zinc injection is performed in the state with the oxide film having already been formed. As a result, generation of Co-58, the radioactive nuclide generated from Ni, is reduced, and radiation exposure can be reduced.

As a reason why the corrosion reduction effect increases in the case that zinc is injected into the 690TT material in which the oxide film is not formed than in the case that zinc is injected into the 690TT material in which the oxide film has been formed before zinc injection, the following reason can be considered. In the 690TT material exposed to high-temperature light water (a primary coolant) in the state with the oxide film not being formed, an oxide film is formed on the surface thereof with lapse of time. However, it is considered that by injecting zinc with the growth of the oxide film, zinc is effectively incorporated into the oxide film, and a corrosion suppression effect due to zinc can be obtained from an initial stage of growth of the oxide film. Accordingly, the amount of Ni transferred into light water through the oxide film is suppressed. On the other hand, when the oxide film is formed on the surface of the 690TT material before zinc injection, the incorporation efficiency of zinc into the oxide film decreases, and the corrosion suppression effect by zinc injection cannot be obtained sufficiently.

The present inventors have found the finding described above as a result of intensive studies, and based on this finding, inject zinc into the inner surface of the primary cooling-system piping in the state with the oxide film not being formed, in the primary cooling-system piping including a member in which the 690TT material is used for a portion coming into contact with the primary coolant C1. That is, zinc is injected at the time of growth of the oxide film. Accordingly, because the corrosion content of the 690TT material is reduced, generation of Co-58 is also reduced, thereby enabling to reduce radiation exposure.

It has been confirmed that even when zinc is injected into the 690TT material in which the oxide film is not formed, that is, even when zinc is injected at the time of growth of the oxide film, stress corrosion cracking resulting from water quality of the primary coolant does not occur. Further, even in an 600MA material (a material obtained by performing heat treatment referred to as mill annealing on an Inconel 600 material), the corrosion reduction effect due to zinc injection in the state with the oxide film not being formed on the inner surface of the primary cooling-system piping can be obtained. A procedure of the method of operating a nuclear plant according to the present embodiment is explained next.

Figure 4:
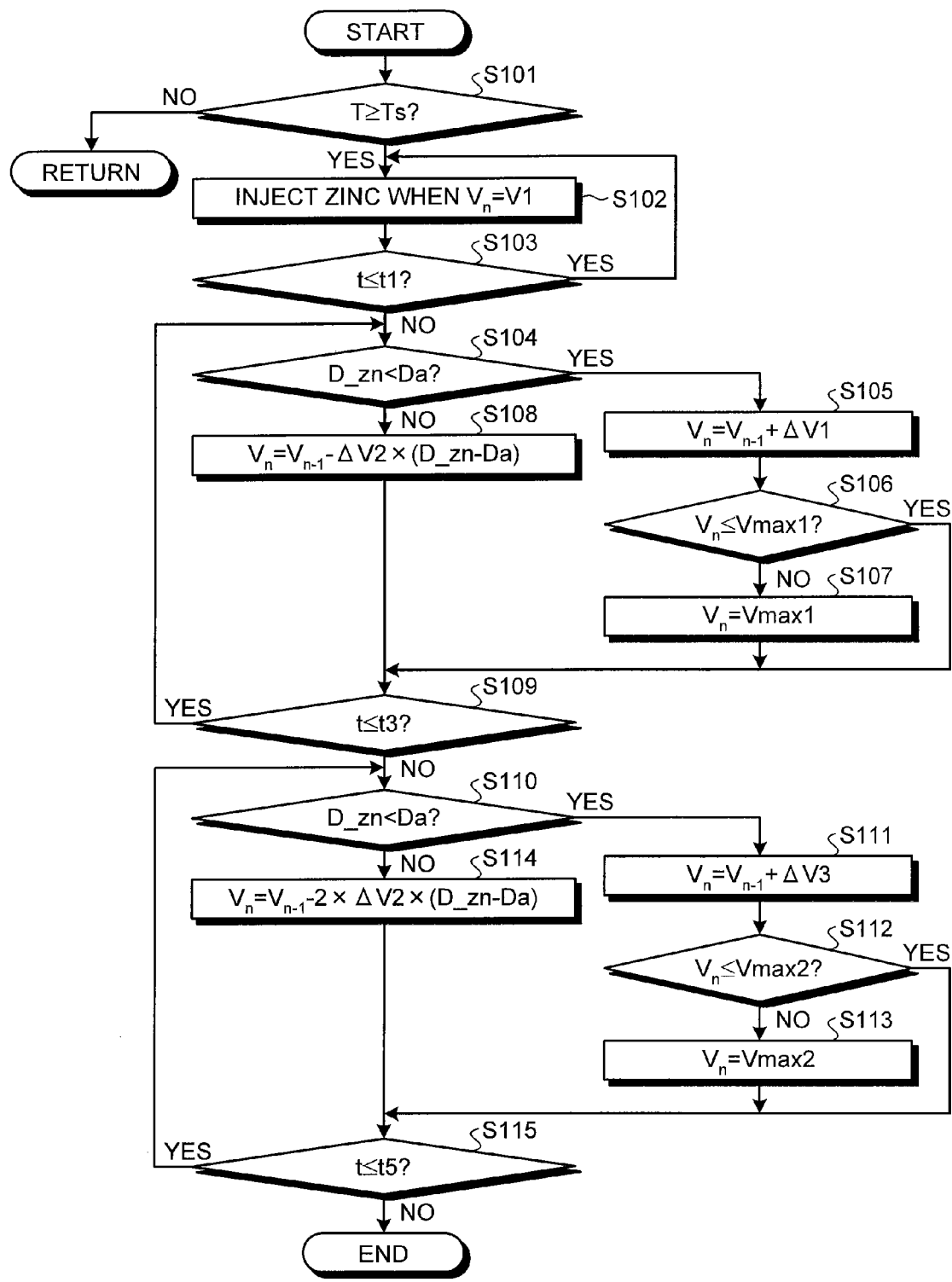
FIG. 4 is a flowchart of a procedure of a method of operating a nuclear plant according to an embodiment of the present invention.

FIG. 4 is a flowchart of a procedure of the method of operating a nuclear plant according to the present embodiment. FIG. 5 is a timing chart of the method of operating a nuclear plant according to the present embodiment. The method of operating a nuclear plant according to the present embodiment is executed after the cold function test and during the hot function test. In the present embodiment, it is assumed that Steps S101 to S103 are an initial stage of zinc injection, Steps S104 to S109 are a first stage of zinc injection, and Steps S110 to S115 are a second stage of zinc injection.

The first stage of zinc injection is a period from the start of the test to about half the period of the entire period of the hot function test. The second stage of zinc injection is a period since completion of the first stage of zinc injection until finishing of the hot function test. The initial stage of zinc injection is a period while zinc is injected at a certain injection rate for several hours since the start of zinc injection, at the first stage of zinc injection.

When the hot function test is started, the primary coolant C1 is heated to raise the temperature. At Step S101, it is determined whether a temperature T of the primary coolant C1 (a coolant temperature) becomes higher than a preset zinc-injection start temperature Ts. An operation is started at a time point when T≥Ts. The zinc-injection start temperature Ts is a temperature at which the oxide film starts to be formed on the inner surface of the primary cooling piping formed of the 690TT material. The zinc-injection start temperature Ts is, for example, higher than 60° C. and lower than 90° C., and is preferably 80° C.

Zinc can be injected when the primary coolant C1 is at a normal temperature Tb. However, the oxide film is hardly formed on the inner surface of the primary cooling piping unless the temperature of the primary coolant C1 is raised to a certain temperature. Accordingly, even when zinc is injected until the temperature of the primary coolant C1 is raised to the certain temperature, because the oxide film that incorporates zinc therein is hardly present, injected zinc is useless. As described in the present embodiment, by injecting zinc after the temperature of the primary coolant C1 is raised to a certain temperature, excessive consumption of zinc can be suppressed, which is preferable. It is desired to inject zinc at least with start of heating of the primary coolant C1.

When it is determined NO at Step S101, that is, when it is determined that T<Ts, control waits until T≥Ts. When it is determined YES at Step S101, that is, when it is determined that T≥Ts, control proceeds to Step S102, where the on-off valve 26 is opened and the aperture of the flow regulating valve 23 is regulated to drive the zinc injection pump 22 (t=t0 in FIG. 5). At this time, the drive condition of the zinc injection pump 22 and the aperture of the flow regulating valve 23 are set so that zinc (depleted zinc acetate) is injected at an injection rate of $V_n$=V1.

A subscript n added to the injection rate V means an injection rate as of this moment. When the injection rate V is changed, the injection rate after the change becomes $V_n$ and the injection rate before the change becomes $V_{n-1}$. The injection rate $V_n$ denotes a mass m (g) of zinc to be injected into the primary cooling system of the nuclear reactor 2 per hour, when it is assumed that the filling pump 15 shown in FIG. 1 causes the primary coolant C1 to flow into the primary cooling system of the nuclear reactor 2 in an amount of R ($m^3$) per hour. The mass m of zinc can be determined based on a concentration Dt of zinc in the zinc tank 21 and the volume Rs of zinc to be supplied from the zinc injection path 25 to the primary-coolant return path 13E. The volume of zinc to be supplied to the primary-coolant return path 13E can be obtained by the flowmeter 28.

In the present embodiment, it is assumed that the injection rate $V_n$ at Step S102 is half an initial maximum injection rate (a maximum injection rate) Vmax1, at the time of injecting zinc in the hot function test. The maximum injection rate Vmax1 is set based on the concentration (40 ppb) in which zinc does not precipitate in a filling line (the primary-coolant return path 13E).

The injection rate $V_n$=Vmax1/2 is maintained for several hours (until t=t1) since the start of zinc injection (t=t0 in FIG. 5). An incorporation amount of zinc into the oxide film formed on the surface of the 690TT material constituting the primary cooling piping is relatively large immediately after the start of zinc injection; however, the concentration of zinc in the primary coolant C1 is low. Therefore, it is desired to quickly increase the concentration of zinc in the primary coolant C1 to a target value, immediately after the start of zinc injection. However, when zinc is injected at the maximum injection rate Vmax1, the target value of the concentration of zinc in the primary coolant C1 can be exceeded at an early point, and control of the zinc concentration can become difficult. Therefore, zinc is injected at an injection rate of $V_n$=Vmax1/2 for several hours since the start of zinc injection (the initial stage of zinc injection).

Control proceeds to Step S103, where it is determined whether an elapsed time since the start of zinc injection (an injection time) t is less than t1. The t1 is a time during which zinc is injected at the injection rate of $V_n$=Vmax1/2 and it is about 6 hours, for example. When it is determined YES at Step S103, that is, when it is determined that t≤t1, because the time during which zinc is injected at the injection rate of $V_n$=Vmax1/2 has not elapsed, zinc is injected at the injection rate of $V_n$=Vmax1/2 until it becomes t>t1.

When it is determined NO at Step S103, that is, when it is determined that t>t1, because the time during which zinc is injected at the injection rate of $V_n$=Vmax1/2 has elapsed, control proceeds to Step S104. After Step S104 (after t=t1 in FIG. 5), that is, at the first stage of zinc injection, the nuclear plant is operated to maintain the injection rate Vn so that a zinc concentration Dz_n of the primary coolant C1 becomes a target value Da of the zinc concentration in the primary coolant C1.

At Step S104, it is determined whether the zinc concentration Dz_n in the primary coolant C1 measured at the primary-coolant sampling spot 29 shown in FIG. 1 is less than the target value Da. At Step S104, when it is determined YES, that is, when it is determined that D_zn<Da, the current zinc concentration Dz_n has not reached the target value Da. At the first stage of zinc injection, because the incorporation amount of zinc into the oxide film formed on the surface of the 690TT material constituting the primary cooling piping is relatively large, when D_zn<Da, it can be determined that incorporation of zinc into the oxide film does not reach thereto. Therefore, control proceeds to Step S105 to increase the injection rate $V_n$ by $\Delta V1$ than the injection rate $V_{n-1}$. That is, $V_n=V_{n-1}+\Delta V1$. $\Delta V1$ is an increase in the injection rate at the first stage, and in the present embodiment, $\Delta V1$ is $Vmax1/4=V1/2$.

Control then proceeds to Step S106, where the injection rate $V_n$ and the maximum injection rate Vmax1 are compared with each other. This procedure is to avoid that the injection rate $V_n$ exceeds the maximum injection rate Vmax1. When it is determined YES at Step S106, that is, when it is determined that $V_n$Vmax1, zinc is injected at the injection rate $V_n$ set at Step S105, and control proceeds to Step S109. When it is determined NO at Step S106, that is, when it is determined that $V_n$>Vmax1, the injection rate $V_n$ is set to the maximum injection rate Vmax1 and zinc is injected at Step S107, and control proceeds to Step S109.

At Step S109, it is determined whether the injection time t is less than t3 (see FIG. 5). Accordingly, it is determined whether the first stage of zinc injection has finished. The t3 is a threshold for determining whether the first stage of zinc injection has finished, and in the present embodiment, t3 is 350 hours since the start of zinc injection (t=t0 in FIG. 5).

When it is determined YES at Step S109, that is, when it is determined that t≤t3, because the first stage of zinc injection has not finished yet, control returns to Step S104 to repeat the procedure after Step S104. When it is determined NO at Step S109, that is, when it is determined that t>t3, because the first stage of zinc injection has finished, control proceeds to Step S110. The procedure is explained while returning to Step S104.

When it is determined NO at Step S104, that is, when it is determined that Da≥D_zn (t=t2 in FIG. 5), the current zinc concentration Dz_n has reached or exceeded the target value Da. In this case, control proceeds to Step S108, to decrease the injection rate $V_n$ than the past injection rate $V_{n-1}$. The injection rate is decreased by subtracting $\Delta V2 \times (D\_zn-Da)$, which is an injection rate corresponding to a difference between the current zinc concentration Dz_n and the target value Da (D_zn-Da) from the past injection rate $V_{n-1}$. That is, the injection rate becomes $V_n=V_{n-1}-\Delta V2 \times (D\_zn-Da)$. $\Delta V2$ is a coefficient for converting the difference between the current zinc concentration Dz_n and the target value Da to the injection rate.

For example, when it is assumed that 27 m³ of the primary coolant C1 per hour is caused to flow into the primary cooling system of the nuclear reactor 2 (27 m³/h), the injection rate $V_n$ corresponding to the concentration 1 ppb of zinc in the primary coolant C1 becomes 0.027 g/h (1 hour). In this case, $\Delta V2=0.027$ g/h.

As described above, by subtracting the injection rate $\Delta V2 \times (D\_zn-Da)$ corresponding to the difference between the current zinc concentration Dz_n and the target value Da from the past injection rate $V_{n-1}$, the concentration of zinc in the primary coolant C1 can be quickly brought to the target value Da. Zinc is injected at the injection rate $V_n$ set at Step S108, and control proceeds to Step S109. For example, when it is determined YES at Step S109, control returns to Step S104. However, when it is determined YES at Step S104, the injection rate $V_n$ is increased by $\Delta V1$ than the past injection rate $V_{n-1}$ (t=t_f1 in FIG. 5). Steps S104 to S109 are repeated until it is determined NO at Step S109. A procedure after Step S110 is explained next.

Step S110 is executed when it is determined NO at Step S109, that is, after the first stage of zinc injection has finished.

The procedure after Step S110 is the second stage of zinc injection. Even after Step S110 (t=t3 and after in FIG. 4), that is, even at the second stage of zinc injection, the injection rate $V_n$ is controlled so that the zinc concentration Dz_n in the primary coolant C1 becomes the target value Da of the zinc concentration in the primary coolant C1.

At Step S110, it is determined whether the zinc concentration Dz_n in the primary coolant C1 acquired at the primary-coolant sampling spot 29 shown in FIG. 1 is less than the target value Da. When it is determined YES at Step S110, that is, when it is determined that D_zn<Da, the current zinc concentration Dz_n has not reached the target value Da. In this case, it can be determined that incorporation of zinc into the oxide film does not reach thereto. Therefore, control proceeds to Step S111, to increase the injection rate $V_n$ by $\Delta V3$ than the past injection rate $V_{n-1}$. That is, $V_n=V_{n-1}+\Delta V3$. $\Delta V3$ is an increase in the injection rate at the second stage, and in the present embodiment, $\Delta V3$ is Vmax1/8=V1/4.

Because the increase $\Delta V1$ in the injection rate at the first stage, which is an increase in the zinc injection rate at the first stage of zinc injection, is Vmax1/4, it is larger than the increase $\Delta V3$ in the injection rate at the second stage, which is an increase in the zinc injection rate at the second stage of zinc injection. At the second stage of zinc injection, incorporation of zinc into the oxide film formed on the surface of the 690TT material constituting the primary cooling piping has made progress, and the formation rate of the oxide film decreases than that at the first stage of zinc injection. Therefore, the increase $\Delta V3$ in the injection rate at the second stage is set smaller than the increase $\Delta V1$ in the injection rate at the first stage, to avoid an abrupt increase in the concentration of zinc in the primary coolant C1.

Control then proceeds to Step S112, where the injection rate $V_n$ is compared with a maximum injection rate Vmax2 at the second stage. This procedure is to avoid that the injection rate $V_n$ exceeds the maximum injection rate Vmax2 at the second stage. As described above, at the second stage of zinc injection, the formation rate of the oxide film decreases more than that at the first stage of zinc injection, and incorporation of zinc into the oxide film has made progress. Therefore, when the injection rate $V_n$ increases excessively, the zinc concentration Dz_n in the primary coolant C1 can exceed the target value Da. To suppress this, at the second stage of zinc injection, the maximum injection rate Vmax2 at the second stage is set smaller than the maximum injection rate Vmax1. In the present embodiment, it is assumed that Vmax2=Vmax1/2.

When it is determined YES at Step S112, that is, when it is determined that $V_n$≤Vmax2, zinc is injected at the injection rate $V_n$ set at Step S111, and control proceeds to Step S115. When it is determined NO at Step S112, that is, when it is determined that $V_n$>Vmax2, the injection rate $V_n$ is set to the maximum injection rate Vmax2 at Step S113, and zinc is injected and control proceeds to Step S115.

At Step S115, it is determined whether the injection time t is equal to or less than t5 (see FIG. 4), thereby determining whether the second stage of zinc injection has finished. The t5 is a threshold for determining whether the second stage of zinc injection has finished, and in the present embodiment, it is 700 hours since the start of zinc injection (t=t0 in FIG. 4). After the second stage of zinc injection has finished, zinc injection is executed even after the first critical state and even after start of a commercial operation of the nuclear plant 1.

When it is determined YES at Step S115, that is, when it is determined that t≤t5, because the second stage of zinc injection has not finished yet, control returns to Step S110 to repeat the procedure after Step S110. When it is determined NO at Step S115, that is, when it is determined that t>t5, because the second stage of zinc injection has finished, the hot function test finishes, to finish the method of operating a nuclear plant according to the present embodiment. Heating of the primary coolant C1 is also terminated due to completion of the hot function test, and zinc injection into the primary coolant C1 also finishes, with termination of heating of the primary coolant C1. Accordingly, excessive consumption of zinc is suppressed. Explanations of the procedure are continued while returning to Step S110.

When it is determined NO at Step S110, that is when it is determined that D_zn≥Da (t=t4 in FIG. 5), the current zinc concentration Dz_n has reached or exceeded the target value Da. In this case, control proceeds to Step S114, to decrease the injection rate $V_n$ than the past injection rate $V_{n-1}$. The injection rate is decreased by subtracting $2 \times \Delta V2 \times (D\_zn - Da)$, which is an injection rate corresponding to a difference between the current zinc concentration Dz_n and the target value Da (D_zn−Da) from the past injection rate $V_{n-1}$. That is, the injection rate becomes $V_n = V_{n-1} - 2 \times \Delta V2 \times (D\_zn - Da)$. ΔV2 is the coefficient for converting the difference between the current zinc concentration Dz_n and the target value Da to the injection rate. While the content thereof has been described above, explanations thereof will be omitted.

Thus, by subtracting the injection rate $2 \times \Delta V2 \times (D\_zn - Da)$ corresponding to the difference between the current zinc concentration Dz_n and the target value Da from the past injection rate $V_{n-1}$, the concentration of zinc in the primary coolant C1 can be quickly brought to the target value D. Zinc is injected at the injection rate $V_n$ set at Step S114, and control proceeds to Step S115. For example, at Step S115, when it is determined YES, control returns to Step S110. However, when it is determined YES at Step S110, the injection rate $V_n$ is increased by ΔV1 than the past injection rate $V_{n-1}$ (t=t_f2 in FIG. 5). Steps S110 to S114 are repeated until it is determined NO at Step S115.

In the present embodiment, a reduction rate of the zinc injection rate at the second stage of zinc injection, that is, the coefficient 2×ΔV2 of the difference between the current zinc concentration Dz_n and the target value Da is larger than that at the first stage of zinc injection, that is, the coefficient ΔV2 of the difference between the current zinc concentration Dz_n and the target value Da. Accordingly, the zinc concentration Dz_n can be quickly reduced, and thus an abrupt increase of the concentration of zinc in the primary coolant C1 is avoided.

In the present embodiment, at the first stage of the zinc concentration, an increase in the zinc injection rate at the first stage of zinc injection is larger than that at the second stage of zinc injection. The rate of decrease of the zinc injection rate at the second stage of zinc injection is larger than that at the first stage of zinc injection. Further, the maximum value of zinc injection rate at the first stage of zinc injection is larger than that at the second stage of zinc injection. Accordingly, the amount of zinc injected into the primary coolant C1 at the first stage of zinc injection becomes larger than that injected into the primary coolant C1 at the second stage of zinc injection.

As a result, at the first stage of zinc injection in which the incorporation amount of zinc into the oxide film formed on the surface of the 690TT material constituting the primary cooling piping is large and the formation rate of the oxide film is large, much more zinc can be made present in the primary coolant C1 and zinc can be efficiently incorporated into the oxide film. On the other hand, at the second stage of zinc injection in which incorporation of zinc into the oxide film formed on the surface of the 690TT material constituting the primary cooling piping has made progress, and the formation rate of the oxide film decreases, because supply of zinc is suppressed, excessive consumption of zinc can be suppressed.

FIG. 6 is a timing chart of the method of operating a nuclear plant according to a modification of the present embodiment. As described above, at the first stage of zinc injection (t=t2 to t3), the incorporation amount of zinc into the oxide film is large, and the formation rate of the oxide film is large; however, at the second stage of zinc injection (t=t4 to t5), incorporation of zinc into the oxide film has made progress and the formation rate of the oxide film decreases. Therefore, the injection rate V is increased at the first stage of zinc injection, and the injection rate V is decreased at the second stage of zinc injection.

More specifically, the injection rate V becomes maximum at the time of starting zinc injection (t=t2), and thereafter, the injection rate V is decreased with the progress of a time t, that is, with the progress of the hot function test. As a result, the amount of zinc injected into the primary coolant C1 at the first stage of zinc injection becomes larger than that injected into the primary coolant C1 at the second stage of zinc injection. Accordingly, the concentration of zinc in the primary coolant C1 can be maintained at an appropriate value corresponding to the formation rate of the oxide film and the incorporation amount of zinc into the oxide film. Also in the example shown in FIG. 6, when heating of the primary coolant C1 is stopped (t=t1, t3, and t5), injection of zinc into the primary coolant C1 is stopped. Further, the period from t=t0 to t=t1 corresponds to the initial stage of zinc injection, during which the injection rate is gradually increased.

In the present embodiment, after construction of the nuclear plant, when the cooling system of the nuclear plant (the primary cooling system in the PWR) raises temperature to around the power operation temperature for the first time, zinc is injected into the coolant (the primary coolant in the PWR) present in the cooling system. That is, zinc is injected in the state with the oxide film not being formed on the inner surface of a piping of the nuclear reactor through which the coolant passes, and the surfaces of core internals, the steam generator structure, and the like coming into contact with the coolant.

Accordingly, it is suppressed that Ni (a parent element of Co-58 as the radiation source) is transferred to the coolant before going critical due to the corrosion suppression effect of zinc, thereby enabling to obtain the radiation exposure reduction effect. Further, because incorporation of Co-58 as the radiation source into the oxide film is suppressed due to incorporation of zinc into the oxide film, the radiation exposure reduction effect can be obtained. Due to these radiation exposure reduction effects, about 10% of reduction of exposure dose equivalent of periodic inspection workers in the nuclear plant, and a reduction of about 20 persons·mSv as the exposure dose can be expected. Further, when the inner surface of a piping of the nuclear reactor through which the coolant passes, and the core internals, the steam generator structure and the like coming into contact with the coolant are formed of the 690TT material, the method of operating a nuclear plant according to the present embodiment is more preferable.

INDUSTRIAL APPLICABILITY

As described above, the method of operating a nuclear plant according to the present invention is useful for reducing radiation exposure by injecting zinc, and the method is particularly suitable for a nuclear plant including a pressurized-water reactor.

EXPLANATIONS OF LETTERS OR NUMERALS 1 nuclear plant
1W containment vessel
2 nuclear reactor
2C nuclear fuel
3 steam generator
3T heat transfer tube
4 pressurizer
5 primary coolant pump
6A primary-coolant first-supply path
6B primary-coolant second-supply path
6C primary-coolant recovery path
7S steam supply path
7R secondary-coolant recovery path
8 turbine
9 condenser
10 power generator
11 regenerative heat exchanger
12 non-regenerative heat exchanger
13A primary-coolant extraction path
13B, 13C, 13D primary coolant path
13E, 13F primary-coolant return path
14 volume control tank
15 charging pump
16 demineralizer
20 zinc injector
21 zinc tank
22 zinc injection pump
23 flow regulating valve
24 zinc supply path
25 zinc injection path
26 on-off valve
28 flowmeter
29 primary-coolant sampling spot

The invention claimed is:

1. A method of operating a nuclear plant including a pressurized water nuclear reactor, comprising injecting zinc into a coolant present in a primary cooling system of the nuclear reactor to form a oxide film on TT690 material which constitutes an inner surface of a primary cooling-system piping, after construction of the nuclear reactor and during execution of a hot function test, wherein
the zinc is injected when a temperature of the coolant becomes a predetermined temperature which is above the range between 60 and 90 Celsius degrees,
an injection rate of the zinc is decreased when a concentration of the zinc in the coolant exceeds a predetermined value,
an injection amount of the zinc in a second stage, in which a generation speed of the oxide film slows compared with a first stage, is reduced compared with that in the first stage.

2. The method of operating a nuclear plant including a pressurized water nuclear reactor according to claim 1, wherein a reduction rate of an injection rate of the zinc at the second stage of injection of the zinc is larger than a reduction rate of an injection rate of the zinc at the first stage of injection of the zinc, and a maximum zinc concentration in a filling line is set to 40 ppb.

* * * * *